UNITED STATES PATENT OFFICE.

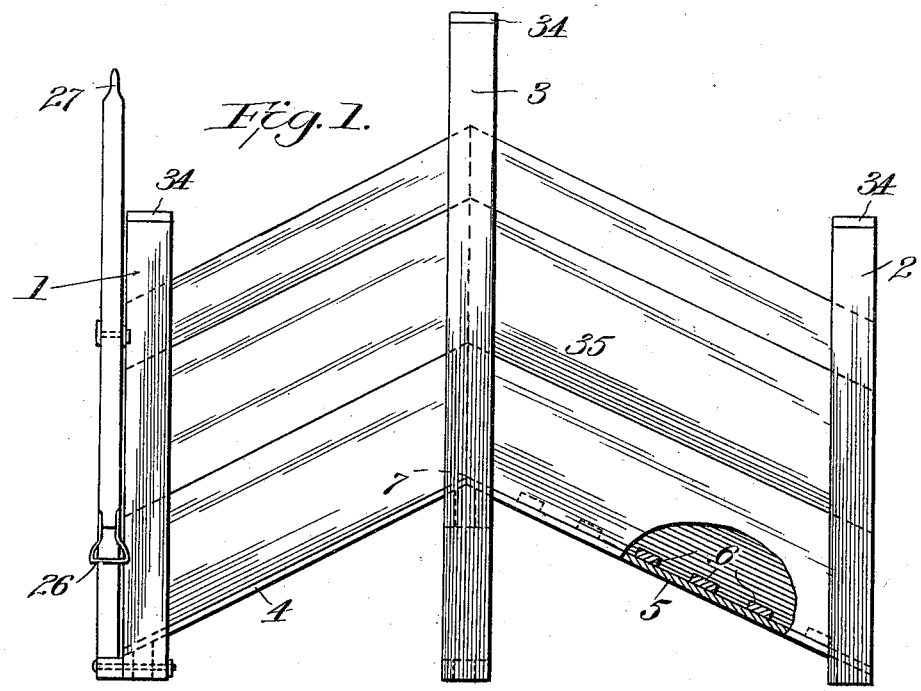

HOWARD MILES SHEESLEY, OF OSCO, ILLINOIS, ASSIGNOR OF ONE-HALF TO ERNEST M. CLARK, OF ROCK ISLAND, ILLINOIS.

HOG-TRAP.

980,015.  Specification of Letters Patent.  Patented Dec. 27, 1910.

Application filed April 26, 1910. Serial No. 557,711.

*To all whom it may concern:*

Be it known that I, HOWARD MILES SHEESLEY, a citizen of the United States, residing at Osco, in the county of Henry and State of Illinois, have invented certain new and useful Improvements in Hog-Traps, of which the following is a specification.

This invention relates to hog traps.

One object of the invention is to provide a hog trap embodying such characteristics that hogs and other animals may be securely held without injury while being washed, ringed, marked, dressed, or subjected to medical treatment or while tusks are being removed from vicious animals.

Another object of the invention resides in the provision of a hog trap constructed to hold the animal without injury either to the animal or the person catching and operating upon it.

A still further object of the invention is to provide a hog trap whose sides are made tight to exclude light at the sides so that the light at the front of the trap will encourage the animal to enter it more readily.

With the above and other objects in view, the present invention consists in the combination and arrangement of parts hereinafter more fully described, illustrated in the accompanying drawings and particularly pointed out in the appended claims, it being understood that changes may be made in the form, proportion, size and minor details without departing from the spirit or sacrificing any of the advantages of the invention.

In the drawings:—Figure 1 is a side elevation of the invention partly in section. Fig. 2 is a front view. Fig. 3 is a top plan view.

Referring now more particularly to the accompanying drawings, the reference characters 1 and 2 indicate front and rear uprights, respectively, and 3 intermediate uprights.

The bottom of the trap consists of the front and rear portions 4 and 5, the former being inclined upwardly from the front and preferably smooth on top and the latter being inclined upwardly from the rear and on its upper face provided with a plurality of cleats 6 to aid the animal in walking upwardly into the trap. As soon as the animal reaches the point 7 in the bottom of the trap he is compelled to move downwardly, and in fact, upon resistance would slide down into the front of the trap, where his neck would be engaged at the opening 8 formed by the oppositely disposed concaved edges 9 of the holding bars 10 and 11 pivoted at their lower ends at 12 to the strip 13 connected to the lower ends of the front uprights 1.

The bar 10 is preferably longer than the bar 11 and both are movable toward and away from each other at their upper ends in a guide 14 formed by a piece of strap iron or other suitable material 15 whose bight portion 16 limits the outward swinging movement of the bar 10. This guide 14—15 has its leg portions spaced intermediate their ends by a spacing element 17 and at its end opposite the bight portion 16 is pivoted at 19 the operating lever 18.

Pivotally connected to the operating lever 18 is a link 21 having pivotal connection at 22 with the upper end of the bar 10, while pivoted at 23 to the operating lever 18 is a second and shorter link 24 which has pivotal connection at 25 with the holding bar 11, the links 21 and 24 being arranged respectively above and below the guide 14—15. By operation of this operating lever 18, the holding bars 10 and 11 are closed or opened, as may be desired, and in order to facilitate opening and closing the bars 10 and 11 and particularly to close them, I provide the lower end of the operating lever 18 with a stirrup 26 designed to receive the operator's foot, while the opposite end of the lever is provided with a handle portion 27 for the operator's hand. Thus the holding bars are operated through the instrumentality of hand and foot power, by virtue of which considerable leverage is permitted.

The reference character 28 indicates a locking lever which has its inner end bent at 29 and pivoted at 22 to the lever 10 and which has teeth 31 on its lower edge adapted to engage the metallic or other plate 32 secured on the upper end of the holding bar 11, said teeth being so arranged that if the holding bars 10 and 11 are in open position, they may be closed against the action of said teeth 31 by operating the lever 18, but when the holding bars are closed, they are held tightly in closed position about the neck of the animal against accidental displacement. The outer end of the locking lever 28 is preferably curved outwardly at 33 so that it may be conveniently raised when it is desired to operate the lever 18 to operate the holding bars 10 and 11.

The front bottom portion 4 of the device is connected at its forward end to the front uprights in such a way as to cause any dirt or foreign matter that may fall thereupon to be easily removed from or by its own gravity slide out of the trap and not fall into crevices that would become clogged, as is the case in some of the hog traps now known.

The side uprights of the trap are preferably braced by the connecting members 34 at the upper ends thereof and the sides 35 are not of skeleton construction, but comprise boards fitted tightly together so as to exclude light and encourage the animal to enter the trap by virtue of the light at the front end thereof.

From the foregoing, it will be seen that I provide a comparatively simple, inexpensive, durable and efficient trap for the performance of the operations hereinbefore stated and as are customary in the holding of hogs or other animals for marking, dressing, vaccinating, or for other purposes.

In order to hold and steady the frame of the trap I provide a guy rope, chain or other suitable element 36, which is secured at 36' in any suitable manner to the frame and which is provided with an eye 37 at its outer end to receive a stake 38 adapted to be driven into the ground. This guy rope 36 will insure steadiness of the trap during operation thereof.

What is claimed is:—

1. A hog trap comprising a frame, hog holding bars pivotally mounted at one end of the frame, a plate secured to one of the bars, a U-shaped guide secured to the frame and in which the upper ends of said bars move backwardly and forwardly, the bight portion of said U-shaped guide forming a stop to prevent undue outward swing of the corresponding bar, said guide projecting beyond the sides of the frame, an operating lever pivoted intermediate its ends to one end of said guide, a link above said guide pivotally connected to said lever and to one of said bars, a link below the guide pivotally connected to said lever and to the other of said bars, a locking lever pivoted to one of said bars and curved adjacent its pivot and having teeth for engagement with said plate, whereby the bars may be locked in adjusted position with relation to each other.

2. A hog trap comprising a frame, hog holding bars pivotally mounted at one end of the frame, a plate secured to one of the bars, a U-shaped guide secured to the frame and in which the upper ends of said bars move backwardly and forwardly, the bight portion of said U-shaped guide forming a stop to prevent undue outward swinging of the corresponding bar, said guide projecting beyond the sides of the frame, an operating lever pivoted intermediate its ends to one end of said guide, a link above said guide pivotally connected to said lever and to one of said bars, a link below the guide pivotally connected to said lever and to the other of said bars, and a locking lever pivoted at one end to one of said bars and provided with teeth for engagement with said plate, whereby said bars may be locked in adjusted relation to each other, and a foot rest carried by the lower end of said operating lever.

In testimony whereof I affix my signature, in the presence of two witnesses.

HOWARD MILES SHEESLEY.

Witnesses:
  HENRY SHEESLEY,
  WALKER KEN.